United States Patent
Ogaki et al.

(10) Patent No.: US 11,075,417 B2
(45) Date of Patent: Jul. 27, 2021

(54) BATTERY COOLING CONTROL SYSTEM

(71) Applicant: HONDA MOTOR CO., LTD., Tokyo (JP)

(72) Inventors: Toru Ogaki, Wako (JP); Manabu Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/561,013

(22) Filed: Sep. 5, 2019

(65) Prior Publication Data

US 2020/0076020 A1 Mar. 5, 2020

(30) Foreign Application Priority Data

Sep. 5, 2018 (JP) .............................. JP2018-165877

(51) Int. Cl.
*H01M 10/633* (2014.01)
*H01M 10/613* (2014.01)
(Continued)

(52) U.S. Cl.
CPC ....... *H01M 10/633* (2015.04); *H01M 10/613* (2015.04); *H01M 10/615* (2015.04);
(Continued)

(58) Field of Classification Search
CPC ............. H01M 10/613; H01M 10/615; H01M 10/625; H01M 10/633; H01M 10/663
See application file for complete search history.

(56) References Cited

U.S. PATENT DOCUMENTS 8,909,397 B2 * 12/2014 Aridome ............... B60W 10/08 701/22
9,114,794 B2 * 8/2015 King ..................... B60L 53/665
(Continued)

FOREIGN PATENT DOCUMENTS

DE 102010063376 6/2012
DE 102014204260 9/2014
(Continued)

OTHER PUBLICATIONS

Japanese Office Action for corresponding JP Application No. 2018-165877, dated May 19, 2020.
(Continued)

*Primary Examiner* — Amanda C. Walke
(74) *Attorney, Agent, or Firm* — Mori & Ward, LLP

(57) ABSTRACT

There is provided a battery cooling control system capable of efficiently and effectively controlling the cooling of a battery. While an electric powered vehicle travels and/or stops, it is determined whether or not there is an indication of a battery being charged, and if it has been determined that there is the indication of charging being performed, it is determined whether or not there is a necessity for cooling the battery, and if it has been determined that there is the necessity for cooling the battery, the battery is cooled to a predetermined value during traveling. In addition, based on at least a state of charge of the battery and/or a driving range, it is determined whether or not there is an indication of charging being executed, and based on a real-time battery temperature, an increase in battery temperature caused by charging, and an upper limit value for a predetermined allowable battery temperature range, it is determined whether or not there is a necessity for cooling the battery.

17 Claims, 2 Drawing Sheets

(51) Int. Cl.
*H01M 10/615* (2014.01)
*H01M 10/6572* (2014.01)
*H01M 10/655* (2014.01)
*H01M 10/6564* (2014.01)
*H01M 10/663* (2014.01)
*H01M 10/625* (2014.01)

(52) U.S. Cl.
CPC ....... *H01M 10/625* (2015.04); *H01M 10/655* (2015.04); *H01M 10/6564* (2015.04); *H01M 10/6572* (2015.04); *H01M 10/663* (2015.04)

(56) References Cited

U.S. PATENT DOCUMENTS

| | | | |
|---|---|---|---|
| 2014/0012445 A1* | 1/2014 | Fleckenstein | H01M 10/625 701/22 |
| 2014/0277869 A1 | 9/2014 | King et al. | |
| 2017/0365901 A1* | 12/2017 | Hiramitsu | H01M 16/006 |
| 2018/0198173 A1* | 7/2018 | Ichikawa | H01M 10/625 |
| 2018/0304765 A1* | 10/2018 | Newman | B60L 58/26 |
| 2019/0221899 A1 | 7/2019 | Tomai et al. | |
| 2020/0067151 A1* | 2/2020 | Yokotsuji | B60W 20/13 |
| 2020/0171974 A1* | 6/2020 | Ikeda | H01M 10/486 |
| 2020/0290427 A1* | 9/2020 | Watanabe | B60H 1/00278 |
| 2020/0290469 A1* | 9/2020 | Lu | B60L 53/31 |
| 2020/0295418 A1* | 9/2020 | Choi | G01R 31/382 |

FOREIGN PATENT DOCUMENTS

| | | |
|---|---|---|
| DE | 102019100710 | 7/2019 |
| JP | 2010-104108 | 5/2010 |
| JP | 2010-158964 | 7/2010 |
| JP | 2012-239344 | 12/2012 |
| JP | 2014-184795 | 10/2014 |

OTHER PUBLICATIONS

German Office Action for corresponding DE Application No. 102019213074.7, dated Jul. 31, 2020.

* cited by examiner

BATTERY COOLING CONTROL SYSTEM

This application is based on and claims the benefit of priority from Japanese Patent Application No. 2018-165877, filed on 5 Sep. 2018, the content of which is incorporated herein by reference.

BACKGROUND OF THE INVENTION

Field of the Invention

The present invention relates to a battery cooling control system.

Related Art

In the related art, an electric powered vehicle such as a fuel cell vehicle, an electric vehicle, or a hybrid vehicle includes, for example, a power control unit (PCU, power conversion device) including an inverter by which direct current power supplied from a drive battery (storage cell) is converted into 3-phase alternating current power; a drive motor (containing a drive motor-generator and the like) that is driven by the 3-phase alternating current power converted by the inverter of the PCU; and a power transmission mechanism that drives the electric powered vehicle to travel by transmitting a drive force of the drive motor to wheels.

In such electric powered vehicle, a control device of the PCU calculates the magnitude of 3-phase alternating current power required for a drive operation based on a vehicle speed, an accelerator pedal opening, or the like of the electric powered vehicle, controls the inverter in response to a calculation result, and supplies a required magnitude of 3-phase alternating current power to the drive motor. Therefore, the required drive force is transmitted from the drive motor to the wheels via the power transmission mechanism, thereby being capable of driving the electric powered vehicle to suitably travel.

On the one hand, since the inverter, the motor, or a plurality of the batteries generate heat while being driven or during power conversion, generally, a cooling device and a cooling system are equipped to cool the inverter, the motor, or the plurality of batteries.

For example, there is a cooling device which is configured such that an inverter, a motor, and a plurality of batteries are stored inside one storage unit formed with a refrigerant circulation path, and the inverter, the motor, and the batteries are cooled by circulating a refrigerant in the refrigerant circulation path while supplying the refrigerant thereto.

Moreover, there is also a cooling device which is configured such that a cabin air conditioning cooling system of an electric powered vehicle is combined and integrated with a cooling system for an inverter, a motor, and a plurality of batteries, and the inverter, the motor, and the plurality of batteries are cooled using an air conditioning refrigerant of the cabin air conditioning cooling system (for example, refer to Patent Document 1).

Patent Document 1: Japanese Unexamined Patent Application, Publication No. 2012-239344

SUMMARY OF THE INVENTION

Herein, as well known, the electric powered vehicle such as electric vehicle demands a large capacity of the drive battery and a high charge speed (increase in charge current from an external power supply). However, if a large capacity of the battery and the high charge speed are applied, accordingly, the temperature of the battery may rise excessively while the battery is charged from an external power supply, and the performance and the charge efficiency of the battery may deteriorate, which is a problem.

In addition, if the charge efficiency deteriorates and the charge time is extended due to an occurrence of deterioration in the performance of the battery, for example, waiting lines for charging around a charging facility in a service area or parking area on a highway may become congested, or a power shortage of the EV may occur due to a user stopping a charge operation in the middle of charging instead of waiting for a full charge of the battery, thereby adversely affecting not only the electric powered vehicle but also a social system in the viewpoint of the widespread use of electric powered vehicles.

For this reason, in order to suitably realize a large capacity of the drive battery and the high charge speed, it is strongly desirable to develop a technique capable of restraining the battery from being overheated during charging and restraining and preventing the performance and the charge efficiency of the battery from deteriorating.

If it is intended that all heat generated by the battery during charging is taken away, the system may become enlarged or complicated, consume, more power, or have a weight increase in order to secure the corresponding cooling performance, thereby causing an increase in total cost. For this reason, a countermeasure to take away all the heat generated by the battery during charging is not realistic.

An object of the present invention is, in light of the problems, to provide a battery cooling control system capable of efficiently and effectively controlling the cooling of a battery.

The inventors have found that it is possible to efficiently and effectively control the cooling of a battery by cooling the battery before charging is performed, and have reached the completion of the present invention. More specifically, the present invention provides the following aspects.

(1) According to the present invention, there is provided a battery cooling control system for controlling the cooling of a drive battery of an electric powered vehicle, the system including a battery charging execution determination unit that determines whether or not there is an indication of the battery being charged while the electric powered vehicle travels and/or stops; a battery cooling necessity determination unit that determines whether or not there is a necessity for cooling the battery, when it has been determined that there is the indication of charging being performed; and a battery cooling system that cools the battery to a predetermined value during traveling and/or stopping, when it has been determined that there is the necessity for cooling the battery.

In the battery cooling control system described in (1), in the drive battery which has a large thermal mass and the temperature of which it is difficult to immediately lower, the temperature of the drive battery is lowered by being subjected to precooling during traveling in which a loss is small or during stop before charging is performed, and thus it is possible to tolerate heat generated during charging thereafter, without prolonging a charge time.

(2) According to the present invention, the battery cooling control system of (1) further includes a battery cooling system that cools the battery while the battery is charged during stop in addition to before charging is performed, when it has been determined that there is a necessity for cooling the battery.

In the battery cooling control system of (2), cooling is performed also during charging, and thus it is possible to start cooling the drive battery at a timing which avoids needless cooling.

(3) According to the present invention, in the battery cooling control system of (1) or (2), the battery charging execution determination unit determines whether or not there is an indication of charging being executed, based on at least a state of charge of the battery and/or a driving range, and the battery cooling necessity determination unit determines whether or not there is a necessity for cooling the battery, based on a real-time battery temperature, an increase in battery temperature caused by charging, and an upper limit value for a predetermined allowable battery temperature range.

(4) According to the present invention, in the battery cooling control system of any one of (1) to (3), the battery charging execution determination unit determines whether or not there is an indication of charging being executed, based on a determination on a necessity for charge, which has been performed based on a distance between a charging facility selected by an occupant or a system of the vehicle and the electric powered vehicle, and the driving range of the electric powered vehicle.

(5) According to the present invention, in the battery cooling control system of any one of (1) to (4), the battery cooling system determines a cooling start time of the battery during traveling and during stop, based on a capacity of cooling performed during traveling, a capacity of cooling performed during charging, a current battery temperature, the upper limit value for the predetermined allowable battery temperature range, and an estimated charging start time.

In the battery cooling control system of (3), (4), and (5) (and (8)), based on the state of charge of the battery, the battery temperature, the driving range, and the distance to the charging facility, it is determined whether or not there is the necessity for charge, and the cooling start time of the battery is suitably set, and thus it is possible to prevent the drive battery from being needlessly precooled.

(6) According to the present invention, in the battery cooling control system of any one of (1) to (5), a refrigerant flow path of the battery cooling system is combined with refrigerant flow path of a cabin air conditioning cooling system of the electric powered vehicle via a heat exchanger, and the battery cooling system is configured to cool the battery by exchanging heat with a refrigerant of the cabin air conditioning cooling system.

(7) According to the present invention in the battery cooling control system of (6), in the heat exchanger, a refrigerant of the battery cooling system is cooled by the refrigerant of the cabin air conditioning cooling system, and is circulated between the heat exchanger and the battery.

In the battery cooling control system of (6) and (7), since the battery cooling system is combined with the cabin air conditioning cooling system via the heat exchanger, it is possible to determine the cooling start time during traveling (and during charging) based on a cooling status in a cabin. Therefore, it is possible to precool the battery while taking into consideration the balance between the cooling function and marketability of the cabin.

(8) According to the present invention, in the battery cooling control system of (6) or (7), a cooling start time of the battery during traveling is determined in response to a cooling status in a cabin.

(9) According to the present invention, in a method for controlling the cooling of the drive battery of the electric powered vehicle, the battery is cooled before charging is performed.

According to the present invention, even with a minimum system configuration, it is possible to efficiently and effectively control the cooling of the battery and restraining the temperature of the battery from rising excessively during charging by optimizing operating conditions of the cooling system.

As a result, according to the present invention, compared to the related art, it is possible to extend the life span of the battery, and to attain a reduction in charge time.

DETAILED DESCRIPTION OF THE INVENTION

Hereinbelow, a battery cooling control system according to an embodiment of the present invention will be described with reference to FIGS. 1 and 2.

Herein, the present embodiment will be described based on the assumption that an electric powered vehicle is a hybrid vehicle and a drive battery is cooled using an air conditioning refrigerant of a cabin air conditioning cooling system of the electric powered vehicle. The electric powered vehicle according to the present invention may be certainly an electric vehicle or a fuel cell vehicle. In addition, the air conditioning refrigerant of the electric powered vehicle may not be necessarily used as a medium for cooling a battery.

Figure 1:
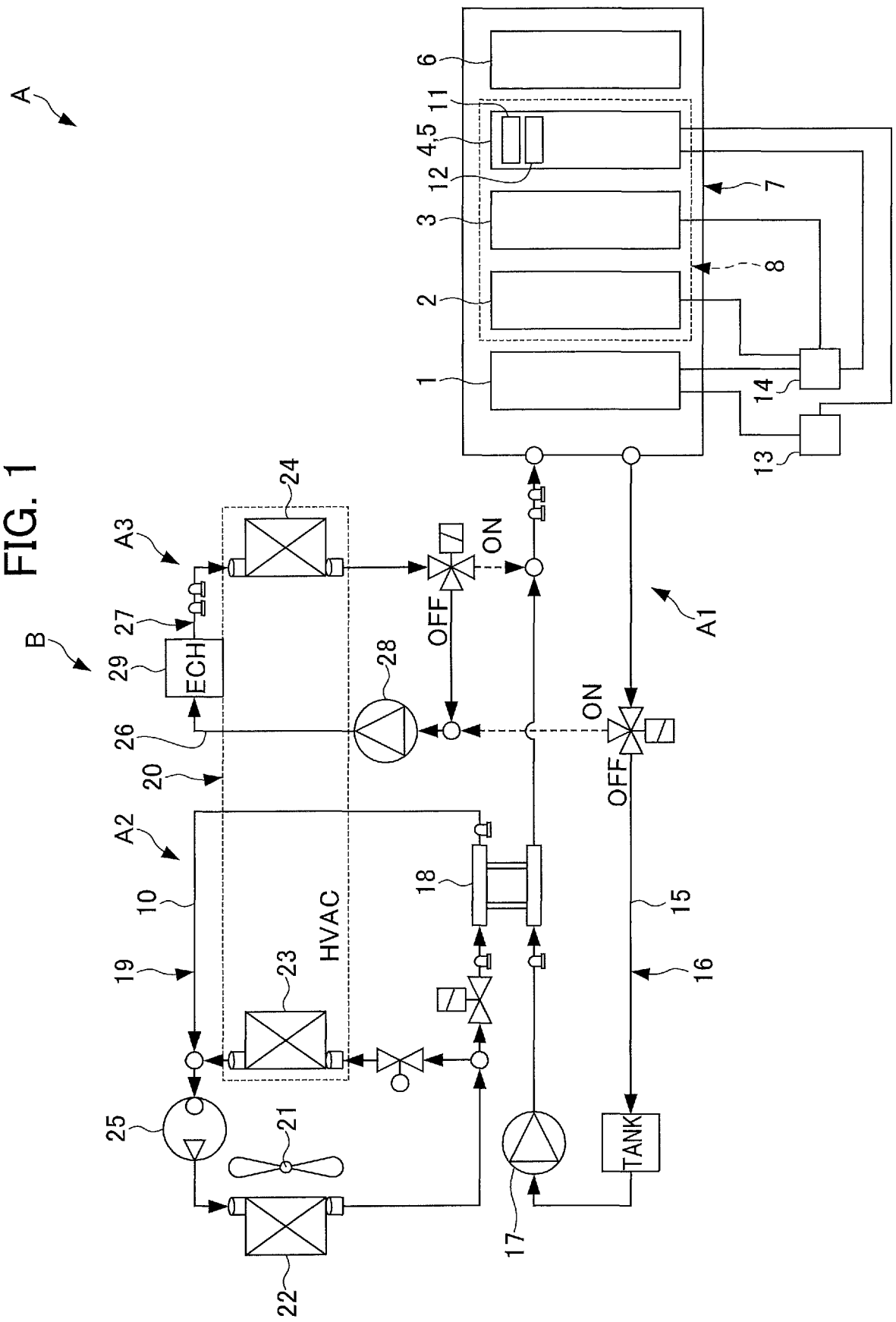
FIG. 1 is a diagram illustrating a battery cooling control system according to an embodiment of the present invention.

Specifically, as illustrated in FIG. 1, the electric powered vehicle of the present embodiment includes an intelligent power unit (IPU) 7 formed of a drive battery 1 such as nickel-hydrogen cell or lithium-ion cell, an inverter (PDU) 2, a DC-DC converter 3, a motor electronic control unit (ECU: control device 4) 5, a fan 6, and the like. A power control unit (PCU) 8 is a portion which is configured to include the inverter 2, the DC-DC converter 3, the ECU 5, and the like.

The IPU 7, which is an electrical component in which the battery 1 is integrated with the control device 4, is stored and provided under a floor of a luggage compartment of the electric powered vehicle in a state where the IPU is contained in an IPU cover of a container. In the electric powered vehicle according to the present invention, a battery cooling control system A is not necessarily limited to having a configuration including the IPU 7.

On the one hand, the battery cooling control system A (and the electric powered vehicle) of the present embodiment is configured such that a battery cooling system A1 (and a PCU cooling system) for cooling each of the battery 1 and the PCU 8 of the IPU 7 is combined and integrated with a cabin air conditioning cooling system A2 of the electric powered vehicle and each of the battery 1 of the IPU 7 and electrical components of the PCU 8 is cooled using an air conditioning refrigerant 10 of the cabin air conditioning cooling system A2.

In addition, the control device 4 includes a battery charging execution determination unit 11 that determines whether or not there is an indication of the charging of the drive battery 1 being executed, and a battery cooling necessity determination unit 12 that determines whether or not there is the necessity for cooling the battery 1 when the battery charging execution determination unit 11 has determined that there is an indication of charging being executed.

The battery cooling control system A of the present embodiment is configured such that when the battery cooling necessity determination unit 12 has determined that there is the necessity for cooling, the battery 1 is cooled to a predetermined temperature while the electric powered vehicle travels and/or the battery 1 of the electric powered vehicle is charged (during stop).

As illustrated in FIG. 1, similar to the related art, the battery cooling control system A (electric powered vehicle) is equipped with an SOC measurement unit 13 that measures a state of charge (SOC) of the drive battery 1; a temperature measurement unit 14 that measures a temperature of the drive battery 1 or the like; and the like. Measurement results of each of the measurement units 13 and 14 are sent to the control device 4 in real-time.

The battery cooling system A1 (and a PCU cooling system) is configured provided with a refrigerant flow path 16 through Which a refrigerant 15 flows; a pump 17; a heat exchanger 18 provided inside a cabin; and the like. The cooling system A1 is configured such that the heat exchanger 18 is combined with a refrigerant flow path 19 of the cabin air conditioning cooling system A2 which will be described later in detail, and the refrigerant 15, which is cooled by exchanging heat with the air conditioning refrigerant 10 circulating through the refrigerant flow path 19 of the cabin air conditioning cooling system A2, is circulated and fed to the battery 1 or electrically driven components of the PCU 8 by driving the pump 17. Therefore, it is possible to cool the drive battery 1 or each of the electrical components of the PCU 8.

The cabin air conditioning system B of the electric powered vehicle of the present embodiment is, for example, a system including a heating ventilation and air conditioning (HVAC) 20, namely, a system that blows air from a fan (21), causes an air path control mechanism to control air, which is dehumidified and cooled or heated by heat exchangers (22, 23, and 24), in modes classified into an inside air, an outside air, a temperature control, and an outlet switching, and properly supplies and discharges the air. The air conditioning system according to the present invention may not be necessarily an HVAC system.

Specifically, the cabin air conditioning system B of the present embodiment includes the cabin air conditioning cooling system A2 and a cabin air conditioning heating system A3.

The cabin air conditioning cooling system A2 is configured such that the refrigerant flow path 19 through which the refrigerant 10 flows is provided with a compressor 25, a condenser 22 which is a heat exchanger and provided outside the cabin, an evaporator 23 which is a heat exchanger and provided inside the cabin, a blower 21 for ventilating outside air to the condenser 22 or the evaporator 23, and the like.

In the cabin air conditioning cooling system A2, if the compressor 25 and the blower 21 are driven, the air conditioning refrigerant 10 such as air conditioning gas in a high-temperature, high-pressure, and semiliquid state compressed by the compressor 25 enters the condenser 22, and the refrigerant 10 inside the condenser 22 is cooled by air generated by the blower 21 such as condenser fan. The liquefaction of the cooled refrigerant 10 progresses, and the liquefied refrigerant 10 is injected into the evaporator 23 from a very small nozzle hole of an expansion valve, and evaporates in a moment. The evaporated refrigerant 10 takes away heat around the evaporator 23, and thus the evaporator 23 is cooled.

The cabin air conditioning cooling system is capable of generating cool air by causing air from a blower such as blower fan to pass through the evaporator 23 which has been cooled. In addition, moistures in the air of the cabin condense into water droplets on the surface of the evaporator 23, and it is possible to perform dehumidification by releasing the water droplets outside the vehicle.

The cabin air conditioning heating system A3 is configured such that a heat medium flow path 27 through which a heat medium 26 flows is provided with a pump 28, an electric heater (ECH) 29, a heater core 24 which is a heat exchanger provided in the cabin, a blower such as blower fan, and the like.

In the cabin air conditioning heating system A3, if the pump 28, the ECH 29, and the blower are driven, the heat medium 26 fed by the pump 28 is heated by the ECH 29, and is fed to the heater core 24.

Therefore, it is possible to generate warm air by causing air from the blower to pass through the heater core 24 which has been warmed. In addition, it is possible to perform air conditioning heating at a desired temperature by adjusting the flow rate of each of the heat medium 26 and the air supplied to the heater core 24.

The electric powered vehicle of the present embodiment is configured such that the refrigerant flow path 19 of the cabin air conditioning cooling system A2 having the foregoing configuration is combined with the heat exchanger 18 of the battery cooling system A1, and the refrigerant 15 flowing through the refrigerant flow path 16 of the battery cooling system A1 (PCU cooling system) is cooled via the heat exchanger 18 by the refrigerant 10 flowing through the refrigerant flow path 19 of the cabin air conditioning cooling system A2. In addition, the battery cooling system A1 (and the PCU cooling system) of the present embodiment is configured as a chiller cooling system.

Subsequently, a method (battery cooling control method of the present embodiment) for cooling the drive battery 1 using a battery cooling control system A of the present embodiment will be described.

Figure 2:
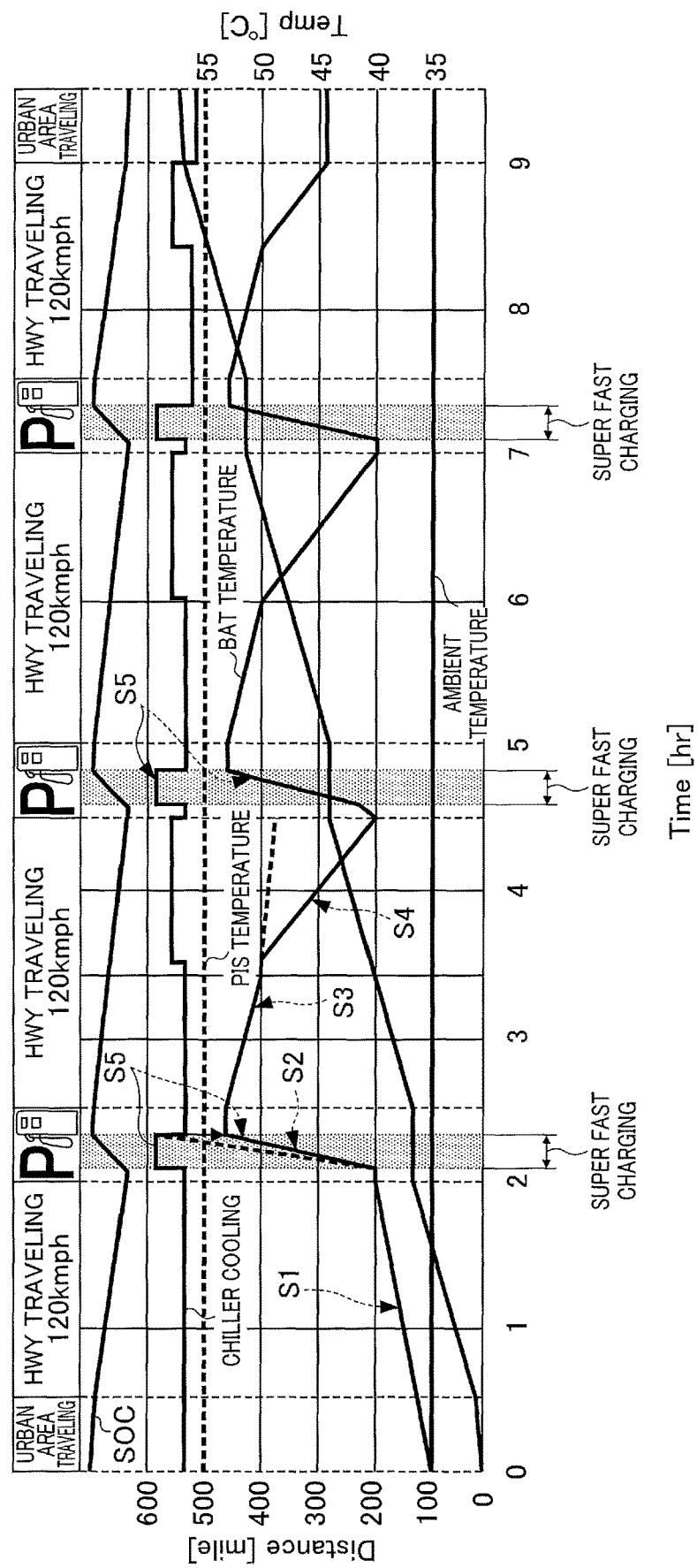
FIG. 2 is a graph illustrating a battery cooling control method according to the embodiment of the present invention.

As illustrated in FIG. 2, the battery cooling control method of the present embodiment will be described, taking as an example a case where the electric powered vehicle is fast charged at a charging facility in a parking area or service area at a stage where the drive battery 1 needs to be charged (or close to needing to be charged) because the electric powered vehicle travels on a highway from an urban area and the SOC decreases, and the electric powered vehicle continues to travel on the highway while being repeatedly charged.

The "SOC" is a charge state/charge rate, namely, the ratio of a remaining charge obtained by subtracting a discharge from a full charge of the battery 1 to the full charge, in other words, is a state of charge of the battery 1, and is expressed by "state of charge (Ah)/full charge capacity (Ah)×100". By the way, a battery (lead storage cell) of a typical small vehicle is used at an SOC of approximately 100 to 90%. A nickel-hydrogen cell exclusively for a hybrid vehicle is used at an SOC of approximately 75 to 25%, and a lithium-ion cell for an electric vehicle (EX) is used at an SOC of approximately 90 to 10% or at an SOC of approximately 80 to 30%. Using the electric powered vehicle while the battery or the cell is repeatedly charged within such SOC range is crucial to extending the cycle life of the battery or the cell.

As illustrated in FIG. 2, if the electric powered vehicle enters the highway from the urban area and travels at a high speed, the temperature (BAT temperature) of the drive battery 1 rises gradually (reference sign S1). If the battery 1 is fast charged at the charging facility in the parking area or the service area at a stage where the SOC has decreased, the temperature of the battery 1 rapidly rises with charging (reference sign S2). After charging has been completed, if the electric powered vehicle restarts to travel on the highway at a high speed in a state where the temperature of the battery 1 has risen, the temperature of the battery 1 decreases gradually but the amount of decrease in the temperature is not so large (reference sign S3).

For this reason, if fast charging is repeatedly performed whenever the SOC decreases, charging is performed in a state where the temperature of the battery 1 is high. In addition, the battery 1 is maintained at a high temperature for a long period of time, thereby causing a deterioration in the performance of the drive battery 1 and a deterioration in charge efficiency, which is a problem.

However, in the battery cooling control method of the present embodiment, as illustrated in FIG. 2 (and FIG. 1), the temperature of the battery 1 before being charged (immediately before being charged) is forced to decrease by driving the battery cooling system A1 at a predetermined stage before charging is performed (reference sign S4).

Specifically, in the present embodiment, while the electric powered vehicle travels, the battery charging execution determination unit 11 of the control device 4 determines whether or not there is an indication of charging being executed, and if it has been determined that there is the indication of charging being executed, the battery cooling necessity determination unit 12 determines whether or not there is the necessity for cooling the drive battery 1. If it has been determined that there is the necessity for cooling the battery 1, the battery 1 before being charged is cooled/precooled to a predetermined temperature value during traveling (reference sign S4).

In addition, in the present embodiment, the battery 1 is cooled by chiller cooling even while being charged during stop (reference sign S5). In cooling during charging by the chiller cooling, a rise in the temperature of the battery 1 is desirably restrained within a temperature of less than or equal to 15° C. by a cooling capacity of greater than or equal to 3 kW.

At that time, in the present embodiment, for example, the battery charging execution determination unit 11 of the control device 4 specifies an indication based on at least an SOC or driving (traveling) range of the battery 1. Namely, a time point the SOC has decreased less than a predetermined threshold value, or a driving range obtained based on an average speed until the time point, the SOC of the battery 1, and the like has decreased less than a predetermined threshold value is obtained, and the time point is specified as the indication.

In addition, based on the real-time temperature of the battery (current temperature of the battery 1), a rise in the temperature of the battery 1 caused by charging, and an upper limit value for a predetermined allowable temperature range of the battery 1, the battery cooling necessity determination unit 12 obtains a time point the temperature of the battery 1 becomes a predetermined upper limit threshold value or does not exceed the upper limit threshold value when the battery 1 is fully charged, and specifies the time point as the indication.

As described above, in the drive battery 1 which has a large thermal mass and the temperature of which it is difficult to immediately lower, the temperature of the drive battery 1 is lowered by being subjected to precooling during traveling in which a loss is small, and thus it is possible to tolerate heat generated during charging thereafter, without prolonging a charge time.

In the present embodiment, based on the distance between a charging facility selected by an occupant or a vehicle system and the host vehicle, and the driving range, it may be determined whether or not there is an indication of charging being executed (the specifying of an indication).

In addition, for example, a car navigation system, a telematics meter, or the like may be connected to the control device 4, the distance to a charging facility in each parking area or service station and an estimated arrival time may be obtained, a parking area or service station in which charging is executed may be determined from a relationship between the distance and the estimated arrival time and a driving range, and an indication may be specified based on the distance and the time it takes to reach the parking area or the service station. In addition, naturally, it may not matter if a terminal device such as smart phone or tablet terminal is connected to the control device and an indication is specified.

If such configuration is employed, it is possible to prevent the drive battery from being needlessly precooled by determining whether or not to there is the necessity for charge, based on the traveling range and the distance to the charging facility.

A cooling start time during traveling or during stop may be determined based on the capacity of cooling performed during traveling, the capacity of cooling performed during charging, the current temperature of the battery 1, the upper limit value for the predetermined allowable temperature range of the battery, and an estimated charging start time. In this case, cooling is also performed during charging, and thus it is possible to start cooling the drive battery 1 at a timing which avoids needless cooling.

In addition, in the present embodiment, since, the battery cooling system A1 is combined with the cabin air conditioning cooling system A2 via the heat exchanger 18, it is possible to determine the cooling start time during traveling based on a cooling status in the cabin. Therefore, it is possible to precool the battery 1 while taking into consideration the balance between the cooling function and marketability of the cabin.

Moreover, since the battery cooling system A1 is combined with the cabin air conditioning cooling system A2 via the heat exchanger 18, the refrigerant 15 of the battery cooling system A1 can be cooled to a desired temperature by exchanging heat with the refrigerant 10 of the cabin air conditioning cooling system A2 in the heat exchanger 18. Therefore, even though a target battery cooling temperature is lower than ambient temperature, it is possible to cool the drive battery 1 by using the function of an air conditioning refrigerating cycle.

In addition, the refrigerant flow rate of each of the battery cooling system A1 and the cabin air conditioning cooling system A2 may be adjusted based on at least any one of the temperature of the battery 1, the cooling start time, and the cooling status in the cabin. Therefore, it is possible to precool the battery 1 while further taking into consideration the balance between the cooling function and marketability of the cabin.

Therefore, even with a minimum system configuration, the battery cooling control system A of the present embodiment is capable of efficiently and effectively controlling the cooling of the battery 1 and restraining the temperature of the battery 1 from rising excessively during charging by optimizing operating conditions of the cooling system.

As a result, according to the battery cooling control system A of the present embodiment, compared to the related art, it is possible to extend the life span of the battery 1, and to attain a reduction in charge time.

One embodiment of the battery cooling control system according to the present invention has been described above, but the present invention is not limited to one embodiment described above, and changes can be properly made without departing from, the concept of the present invention.

In the present embodiment, an example where the battery is cooled during traveling on a highway has been described. However, the present invention is not necessarily limited to cooling the battery during traveling on the highway. Naturally, the present invention can be applied also to a case where the electric powered vehicle travels on a general road or the like and is charged at a charging facility provided at a proper location. In addition, in the present embodiment, an example where in addition to being charged during traveling, the battery is cooled while being charged during stop has been described. However, the battery may be cooled either during traveling or during stop, and moreover, the battery may be cooled during stop before being charged.

In addition, the system may be configured such that an operation button (operation unit) or the like for driving the battery cooling system A1 is provided in a dashboard or the like, and when an occupant (mainly, a driver) has considered performing charging soon, the occupant allows the cooling of the drive battery 1 to start by operating the operation button based on a judgment of intention of the occupant. Namely, the system may be configured such that it is determined that there is an indication of the operation button being operated based on a judgment of intention of the occupant, and the cooling of the drive battery 1 is started. Also in this case, it is possible to obtain the same working effects as in the present embodiment.

Moreover, there may be included a charging recommendation notification unit that notifies the occupant (mainly, the driver) of the timing for charging the battery 1, a recommended charging facility, and the like based on the SOC of the battery 1, the driving range, the distance and time it takes to reach the charging facility, and the like. In this case, for example, if the occupant recognizes a notice from the charging recommendation notification unit, causes the pre-cooling of the drive battery 1 to be started by operating the operation button, and causes charging to be performed at the recommended charging facility, the charge operation becomes an operation performed at optimum charge timing, namely, at timing a load applied to the battery 1 is small and charging can be efficiently performed. As a result, it is possible to further extend the life span of the battery 1, and realize a reduction in charge time.

EXPLANATION OF REFERENCE NUMERALS

1 DRIVE BATTERY
2 INVERTER (PDU)
3 DC-DC CONVERTER
4 CONTROL DEVICE
5 MOTOR ECU
6 FAN
7 IPU
8 PCU
10 REFRIGERANT
11 BATTERY CHARGING EXECUTION DETERMINATION UNIT
12 BATTERY COOLING NECESSITY DETERMINATION UNIT
13 SOC MEASUREMENT UNIT
14 TEMPERATURE MEASUREMENT UNIT
15 REFRIGERANT
16 REFRIGERANT FLOW PATH
17 PUMP
18 HEAT EXCHANGER
19 REFRIGERANT FLOW PATH
20 HVAC
21 BLOWER
22 CONDENSER
23 EVAPORATOR
24 HEATER CORE
25 COMPRESSOR
26 HEAT MEDIUM
27 HEAT MEDIUM FLOW PATH
28 PUMP
29 ECH
A BATTERY COOLING CONTROL SYSTEM
A1 BATTERY COOLING SYSTEM
A2 CABIN AIR CONDITIONING COOLING SYSTEM
A3 CABIN AIR CONDITIONING HEATING SYSTEM
B CABIN AIR CONDITIONING SYSTEM OF ELECTRIC POWERED VEHICLE

What is claimed is:

1. A battery cooling control system for controlling the cooling of a drive battery of an electric powered vehicle, the system comprising:
   a battery charging execution determination unit that determines whether or not there is an indication of the battery being charged while the electric powered vehicle travels and/or stops;
   a battery cooling necessity determination unit that determines whether or not there is a necessity for cooling the battery, when it has been determined that there is the indication of charging being performed; and
   a battery cooling system that cools the battery to a predetermined value during traveling and/or stopping, when it has been determined that there is the necessity for cooling the battery,
   wherein the battery cooling necessity determination unit determines whether or not there is a necessity for cooling the battery, based on a real-time battery temperature, an increase in battery temperature caused by charging, and an upper limit value for a predetermined allowable battery temperature range.

2. The battery cooling control system according to claim 1,
   wherein the battery cooling system cools the battery while the battery is charged during stop in addition to before charging is performed, when it has been determined that there is a necessity for cooling the battery.

3. The battery cooling control system according to claim 1,
   wherein the battery charging execution determination unit determines whether or not there is an indication of charging being executed, based on at least a state of charge of the battery and/or a driving range.

4. The battery cooling control system according to claim 1,
   wherein the battery charging execution determination unit determines whether or not there is an indication of charging being executed, based on a determination on a necessity for charge, which has been performed based on a distance between a charging facility selected by an occupant or a system of the vehicle and the electric powered vehicle, and the driving range of the electric powered vehicle.

5. The battery cooling control system according to claim 1,
wherein the battery cooling system determines a cooling start time of the battery during traveling and during stop, based on a capacity of cooling performed during traveling, a capacity of cooling performed during charging, a current battery temperature, the upper limit value for the predetermined allowable battery temperature range, and an estimated charging start time.

6. The battery cooling control system according to claim 1,
wherein a refrigerant flow path of the battery cooling system is combined with a refrigerant flow path of a cabin air conditioning cooling system of the electric powered vehicle via a heat exchanger, and
wherein the battery cooling system is configured to cool the battery by exchanging heat with a refrigerant of the cabin air conditioning cooling system.

7. The battery cooling control system according to claim 6,
wherein in the heat exchanger, a refrigerant of the battery cooling system is cooled by the refrigerant of the cabin air conditioning cooling system, and is circulated between the heat exchanger and the battery.

8. The battery cooling control system according to claim 6,
wherein a cooling start time of the battery during traveling is determined in response to a cooling status in a cabin.

9. The battery cooling control system according to claim 1,
wherein the battery cooling system cools the battery before the battery is charged.

10. The battery cooling control system according to claim 1,
wherein the battery charging execution determination unit obtains a distance to a charging facility and an estimated arrival time based on the data acquired from a navigation device of the electric vehicle, and specifies the indication based on the distance and the estimated arrival time.

11. The battery cooling control system according to claim 10,
wherein the battery cooling system cools the battery while the battery is charged during stop in addition to before charging is performed, when it has been determined that there is a necessity for cooling the battery.

12. The battery cooling control system according to claim 10,
wherein the battery charging execution determination unit determines whether or not there is an indication of charging being executed, based on at least a state of charge of the battery and/or a driving range.

13. The battery cooling control system according to claim 10,
wherein the battery cooling necessity determination unit determines whether or not there is an indication of charging being executed, based on a determination on a necessity for charge, which has been performed based on a distance between a charging facility selected by an occupant or a system of the vehicle and the electric powered vehicle, and the driving range of the electric powered vehicle.

14. The battery cooling control system according to claim 10,
wherein the battery cooling system determines a cooling start time of the battery during traveling and during stop, based on a capacity of cooling performed during traveling, a capacity of cooling performed during charging, a current battery temperature, the upper limit value for the predetermined allowable battery temperature range, and an estimated charging start time.

15. The battery cooling control system according to claim 10,
wherein a refrigerant flow path of the battery cooling system is combined with a refrigerant flow path of a cabin air conditioning cooling system of the electric powered vehicle via a heat exchanger, and
wherein the battery cooling system is configured to cool the battery by exchanging heat with a refrigerant of the cabin air conditioning cooling system.

16. The battery cooling control system according to claim 15,
wherein in the heat exchanger, a refrigerant of the battery cooling system is cooled by the refrigerant of the cabin air conditioning cooling system, and is circulated between the heat exchanger and the battery.

17. The battery cooling control system according to claim 15,
wherein a cooling start time of the battery during traveling is determined in response to a cooling status in a cabin.

* * * * *